United States Patent [19]

Claisse

[11] Patent Number: 4,609,392

[45] Date of Patent: Sep. 2, 1986

[54] SAMPLE PREPARATION MACHINE

[75] Inventor: Fernand Claisse, Sainte-Foy, Canada

[73] Assignee: Gestion Financiere Duberger Inc., Sainte Foy, Canada

[21] Appl. No.: 708,465

[22] Filed: Mar. 5, 1985

[30] Foreign Application Priority Data

Mar. 5, 1984 [CA] Canada .................................. 448803

[51] Int. Cl.[4] ................................................ C03B 5/18

[52] U.S. Cl. .......................................... 65/134; 65/66; 65/178; 65/181

[58] Field of Search .................... 65/62, 66, 68, 76, 78, 65/134, 178, 181

[56] References Cited

U.S. PATENT DOCUMENTS 2,079,111 5/1937 Edgar et al. ...................... 65/181 X 4,045,202 8/1977 Claisse .................................. 65/178

FOREIGN PATENT DOCUMENTS 2757706 12/1977 Fed. Rep. of Germany .

7734641 7/1978 France .

1527321 1/1977 United Kingdom .

*Primary Examiner*—Arthur Kellogg

*Attorney, Agent, or Firm*—Schwartz, Jeffery, Schwaab, Mack, Blumenthal & Evans

[57] ABSTRACT

This invention relates to an apparatus for preparing samples. These samples will be used for making disks and solutions for subsequent analysis by chemical or physical means. The machine contains an assembly of several gas burners with a crucible above each of them for heating and melting the sample-flux mixture. Efficient mixing in the melt is obtained by providing a crucible with a new shape in combination with a periodic tilting or rotation of the crucible. Solutions are prepared by pouring the hot molten glass mixture into beakers containing an acid and by agitating the acid and the glass particles. Glass disks are prepared by placing moulds above the crucibles during heating and by turning the crucibles and the moulds upside down so that the hot molten glass mixture flows into the moulds for subsequent solidification into solid glass disks of high quality, ready for analysis without further processing. Various shapes of crucibles are disclosed. This apparatus gives a better homogeneity of the molten glass mixture within a shorter period of time.

33 Claims, 9 Drawing Figures

FIG. 2A
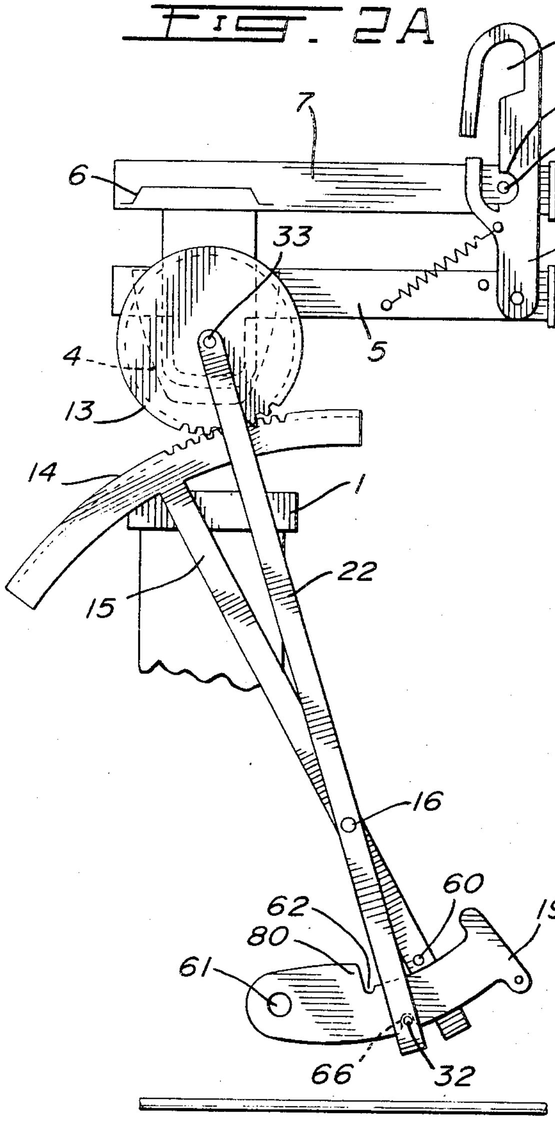
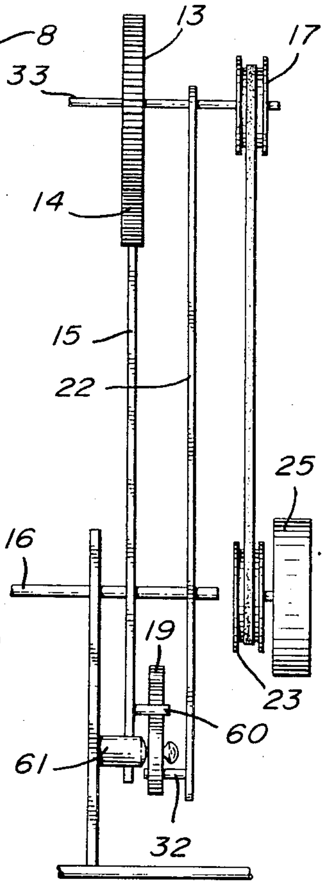
FIG. 2B

FIG. 3A
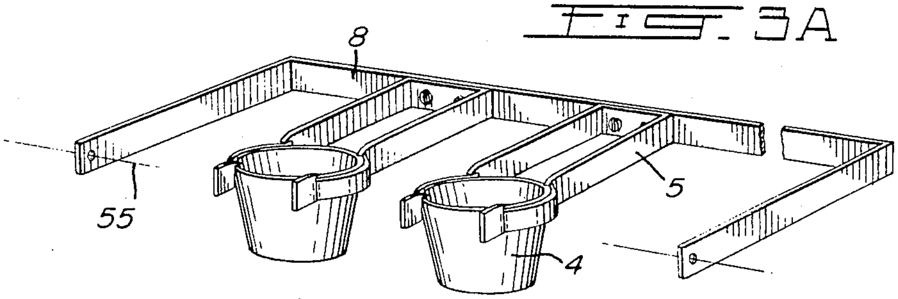
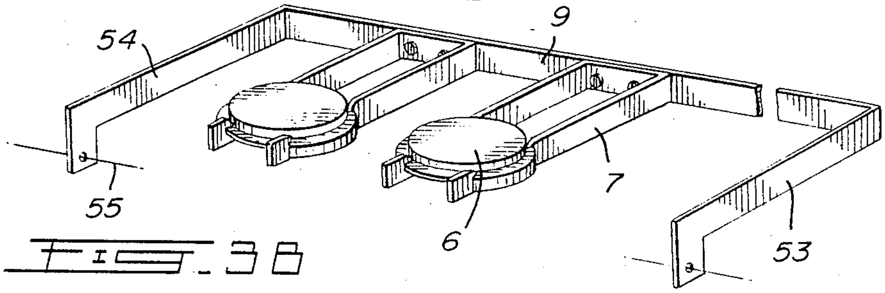
FIG. 3B
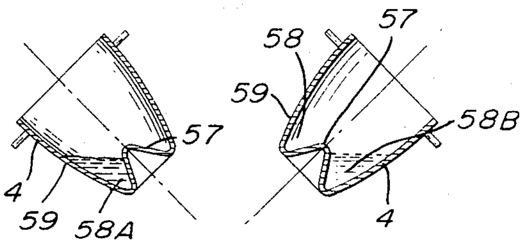
FIG. 4
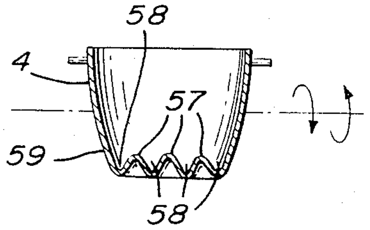
FIG. 5
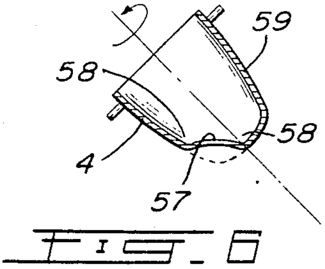
FIG. 6

SAMPLE PREPARATION MACHINE

BACKGROUND OF INVENTION

1. Field of the Invention

This invention relates to an apparatus for melting and diffusing materials to produce a homogeneous mixture. More particularly, this invention relates to a machine adapted to transform materials into glass disks or solutions.

2. Description of Prior Art

In 1956, I have discovered a technique for the preparation of samples that increases the accuracy of X-Ray fluorescence analysis up to one hundredfold. That technique consists in heating a mixture of a sample and a glass forming flux at sufficiently high temperature, until the mixture is completely fused, agitating the molten glass until it is homogeneous and pouring it into a mould to obtain a solid glass sample of desired shape. In 1974, I invented a machine for automatically carrying out the operations involved in the above method. This machine was patented in Canada under Canadian Pat. No. 1,011,556 and in the United States under U.S. Pat. No. 4,045,202. In these Patents, I pointed out that rapid mixing during fusion is necessary in order to obtain homogeneity of the glass within the shortest time possible. The reason is that high accuracy of analysis may not be obtained if the heating time is too long because this may lead to an evaporation of the elements of the original sample and the elements constituting the flux. In that patented machine, a rapid mixing was obtained by rapidly moving the crucibles containing the heated mixture. That motion is back and forth, left and right, up and down in a complex fashion. Since the overall motion would normally bring the crucibles outside the flame of the gas burners used as a source of heat if the burners would be fixed relating to the crucibles in motion, it was necessary to move the burners together with the crucibles so that the crucibles remained in the flame at all times during heating. In other words, the efficient mixing of the molten glass was primarily the result of fast complex displacements of the crucibles.

Other machines were built by others to apply the sample preparation fusion technique that I have invented and to my knowledge, presently there is no other machine which is available in which the crucibles move fast enough to ensure an efficient mixing of the sample and of the flux. It is very doubtful that the solid glass disks produced by the presently available machines are homogeneous unless the heating time is substantially longer than with my first machine.

In 1977, I obtained French Pat. No. 7734641; German Pat. No. 2,757,706 and British Pat. No. 1,527,321 for a machine of similar type, but that can pour the molten glass into a beaker containing an acid to obtain a clear solution after a short period of agitation.

SUMMARY OF INVENTION

The machines that I have invented earlier produce high quality glass samples and clear liquid solutions but the vigorous motion that is required of the burners and of the crucibles necessitates occasional readjustments of the mechanical parts of the machine.

In order to avoid these shortcomings, I have invented a new machine, based on a different principle of mixing, that produces highly homogeneous fused samples within a shorter time and without vigorous or violent motion of the crucibles or of any other part of the machine.

In this new machine, the efficient mixing is essentially the result of the shape given to the crucible containing the molten glass; a motion of the crucible is still necessary but there is an optimal motion speed that gives a better rate of homogenization; it is low as opposed to the actual state of the art where increasing the agitation speed usually increases the speed of homogenization.

An object of the present invention is to achieve a better homogeneity of the molten glass within a shorter possible time.

Another object of the present invention is to provide efficient mixing crucibles which are shaped in such a way that the molten or partially molten mixture must pass through narrow passages when the crucible is rocked back and forth, thus producing convection currents in the molten glass from a slow motion of the crucible.

Another object of the present invention is to provide an efficient way of casting the molten glass into preheated moulds.

Another object of the present invention is to provide a holder for crucibles and moulds that allow the moulds to stand above the crucibles during fusion of the glass mixture where they are preheated without any additional heat sources except those which are used to heat the crucibles.

It is another object of the present invention to enable the moulds and crucibles to tip over whereby the molten glass will be poured into the moulds, and to allow easy removal of the solid glass disks from the moulds after cooling.

Another object of the present invention is to produce either glass disks or solutions on the same machine without having to make any operation or modification of the machine when changing from one product to the other except for the substitution of the container that receives the molten glass.

It is another object of the present invention to provide a holder for crucibles and moulds that is designed in such a manner that transfer of the molten glass to the beakers or to the moulds occurs close to the burners where either moulds or beakers can stand.

Another object of the present invention is to process non-glass-forming reducing samples such as sulfide ores, metals, catalysts, organic materials, etc. in the same way as glass-forming oxide samples, without having to preoxidize those samples and without risking chemical attack of the crucibles by them.

It is another object of the present invention to provide an injector that supplies air or oxygen into the crucible above the sample-flux mixture during heating and melting, thus allowing corrosive reducing compounds to be converted into non-corrosive oxide compounds before they can attack the crucibles, thereby increasing the life of the crucibles by slowing down the corrosion resulting from minor corrosive components which are often present in the samples.

Another object of the present invention is to minimize the contamination of the glass by the elements that are combined with the iodine or bromine elements that are added into the fusion mixture as releasing agents to prevent the glass from sticking to the crucibles and moulds.

It is another object of the present invention to provide a device for introducing a releasing agent in the crucibles automatically just before pouring the glass when its effect is more substantial, thus considerably decreasing the amount of releasing agent which is necessary and minimizing any consequent sample contamination, as compared to the machines presently known in the art where a large excess of releasing agent is added manually prior to heating.

It is another object of the present invention to provide an apparatus for melting and diffusing materials comprising: a plurality of crucibles, each said crucible being formed with at least one inner protrusion therein to form narrower passages in said crucible; a rotatable crucible support and means for mounting said crucibles on said rotatable crucible support, heating means for melting the content of said crucibles, means to produce continuous deformation of the molten content of said crucible consecutive to continuous movement of said molten content in and out of said narrower passages so as to produce substantially homogeneous diffusion of the materials in said crucibles, and means associated with said rotatable support to pour the molten contents of diffused materials present in said crucibles, into containers such as moulds or beakers.

In accordance with a preferred embodiment of the invention, rotation of the crucibles includes rocking the crucible holder to cause a continuous tilting of the crucibles resulting in the continous deformation of their molten content.

It is another object of the present invention to provide a crucible for fusing materials which is typically formed with tapering curving walls and a flat bottom, characterized in that it comprises at least one inner protrusion to form narrower passages in said crucibles.

It is another object of the present invention to provide a method for melting and diffusing materials by heating said materials in a crucible until fusion, and stirring the resulting molten mixture, the improvement which comprises providing said crucible with at least one inner protrusion therein to form narrower passages in said crucible, and producing a continuous deformation of the molten content of said crucible consecutive to continuous movement of said molten content in and out of said narrower passages so as to product substantially homogenous diffusion of said materials in said crucible.

BRIEF DESCRIPTION OF DRAWINGS

These and other objects of the present invention and how they can be achieved, as well as a fuller understanding of my invention may be had by referring to the following description and claims taken conjunction with the accompanying drawings in which:

FIG. 2*a* represents an end view of the machine illustrated in FIG. 1*a*, showing the mechanism for driving the crucibles and the moulds;

FIG. 2*b* is a front view of the driving mechanism illustrated in FIG. 2*a;*

FIG. 3*a* represents a view showing the supports for the crucibles;

FIG. 3*b* represents a view showing the supports for the moulds;

FIG. 4 represents cross-section views of an efficient-mixing crucible according to the invention formed with a protrusion at the bottom thereof, in the two extreme positions during tilting about a horizontal axis passing through the crucible;

FIG. 5 represents a cross-section view of another embodiment of an efficient-mixing crucible according to the invention formed with a row of protrusions at the bottom; and FIG. 6 represents a cross-section view of another efficient-mixing crucible according to the invention formed with a protrusion at the lower end of the wall.

DESCRIPTION OF PREFERRED EMBODIMENTS

Figures 1A, 1B:
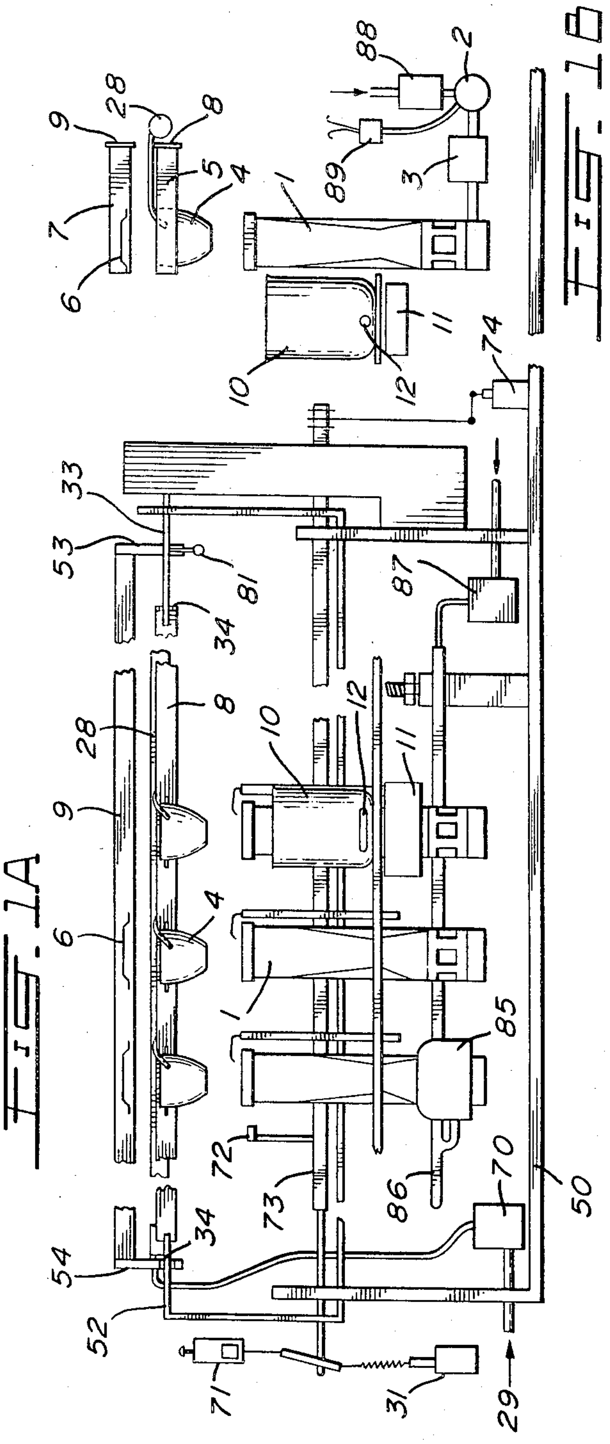
FIG. 1*a* represents a front view of a machine according to the invention with three burners only, and arranged to prepare two glass disks (left) and one solution (right)
FIG. 1*b* represents a cross-section of the machine illustrated in FIG. 1*a*, taken along a plane passing through a burner.

With reference to the drawings, an apparatus according to the invention is mainly illustrated in Figures 1*a*, 1*b*, 2*a*, 2*b*, 3*a* and 3*b*. The apparatus comprises an assembly of gas burners 1 (only three being shown in the drawings, it being understood that any suitable number may be provided as long as the apparatus is convenient to operate) which are all connected to a main gas pipe 2 by means of electromagnetic gas valves 3. The gas pipe is in turn connected to a gas supply (not illustrated in the drawings) in a manner known to those skilled in the art. The gas pressure is controlled through a flow control valve 88 and a pressure detector 89.

Above each burner 1, there is specially designed crucible 4 which will be described more in detail later and which is held in known manner by means of a U-shaped fork type crucible holder 5 above each burner 1.

Above each crucible 4, there is a mould 6 which is held by means of a mould holder 7. This means that when it is intended to form disks from the molten material, there are the same number of crucibles 4 and moulds 6. In other words, for each crucible 4, there is a corresponding mould 6.

The apparatus of course comprises a frame 50. Each mould 6 is held by a mould support in the form of a U-shaped member 9 which is mounted on the frame 50 in the manner illustrated in FIG. 1*a* of the drawings. The U-shaped member 9 has fixed thereto the fork type mold holders 7 and the moulds 6 are held by the mould holders 7. As will be explained below, the U-shaped ber 9 should be capable of rotation, and for this purpose it is provided with shaft portions 33 and 52 which are respectively associated with both legs 53 and 54 of the U-shaped member 9 to define the axis of rotation 55 of the mould support. As shown in FIG. 3*a*, the crucibles are spacedly aligned along the U-shaped member 8 so that the axis of rotation of the crucible support extends through the aligned crucibles.

Before proceeding further with the apparatus according to the invention, as illustrated in the enclosed drawings, it is believed that the crucible which is one of the main characteristics of the invention should now be described. Essentially, the crucible 4 is of standard construction, i.e. it is generally inversely frusto-conical and has the general shape as illustrated in FIGS. 4, 5 and 6. However, it is essential that it be provided with at least one inner protrusion 57. In the model which is used in the apparatus which is illustrated, the inner protrusion 57 is rounded and conically shaped. In the model illustrated in FIG. 4, there is one central inner protrusion 57 which is rounded and is conically shaped. The protrusion appears centrally at the bottom of the crucible. In the model illustrated in FIG. 5, there is a row of three similar inner rounded conically shaped protrusions 57 formed at the bottom of the crucible 4. It will be realised that these protrusions will define narrower passages 58 between them and the walls 59 of the crucible 4.

Referring again to FIGS. 1*a*, 1*b*, 2*a* and 2*b*, it will be seen that the mould support 9 is coupled to a crucible support 8, and that the latter comprises a plurality of crucible holders 5 equal to the number of crucibles which serve to hold the crucibles opposite the moulds 6, as shown in FIGS. 1*a*, 1*b*, 2*a* and 2*b*. More particularly, a latch 35 positions the crucibles immediately under the moulds when fusing of the materials takes place.

The apparatus can be used to produce disks and, in the present case, moulds will be utilised. On the other hand, if the analysis of the sample is to be carried out with a solution, then the fused materials which are present in a crucible 4 will be poured into a beaker 10 which is placed in front of each burner 1 (only one being illustrated in FIGS. 1*a* and 1*b* of the drawings). A conventional means is used to stir the content of the beaker 10 and in the illustrated embodiment, there is used a magnetic motor 11 located under the beaker which serves to agitate the magnetic bar 12 which is present in the solution.

Generally speaking, pouring of the crucible takes place by providing a rotation through the shaft portions 33, 52, thus rotating the mould support. This rotation should be capable of inducing a rotation of the crucibles to pour the molten materials into the moulds. This operation should of course be alternated with periodic tilting of the crucibles.

With reference again to FIGS. 2*a* and 2*b* of the drawings, it will be seen that the apparatus illustrated comprises a tilting arm 15 which is formed at its upper end with a toothed rack 14. A toothed gear 13 which is pivoted on shaft 33 meshes with the toothed rack 14 and engages the shaft 33. There is a pivot member 16 along the tilting arm 15 about which the latter can pivot. At the lower end of the tilting arm 15, there is an engageable pin 60. Mounted on the frame in known manner, there is a latch 19 which is adapted to pivot about axis 61, provided in known manner, the latch being formed with an opening 62 to engage the engageable pin 60. During fusion, the opening 62 of the latch 19 is disengaged from the engageable pin 60, to permit free pivoting of the tilting arm 15 about the pivot member 16.

In addition, there is an overturning arm 22 which is pivoted along its length on the pivot member 16. The upper end of the overturning arm 22 is connected to the toothed gear 13 for free rotation of the latter. At the lower end of the overturning arm 22, there is an engageable pin 32. The latch 19 has an opening 66 to engage the engageable pin 32. When the tilting arm 15 is blocked by the latch 19, the opening 66 of the latch 19 is disengaged from the engageable pin 32 to permit free pivoting of the overturning arm 22 about the pivot member 16. A system of pulleys 17 and 23 and motor 25, will cause the oscillation of the overturning arm 22 about the pivot member 16 when the latch 19 is disengaged from the engageable pin 32 and during this operation, the tilting arm 15 is blocked by the latch 19 to cause the toothed gear 13 to ride back and forth on the toothed rack 14 thereby provoking a sufficient rotation of the mould support 9 to overturn the moulds 6 to receive the contents of the crucibles into them.

We shall now describe the driving mechanism 17, 23, which alternately causes the oscillation of the arms 15 and 22. The motor 25 is aligned with the shaft 16 but is not connected to it. This motor 25 is a stepping motor and rotates forward and backward as requested by a microprocessor motor control (not shown). When the overturning arm 22 is engaged at its pin 32 by the latch 19, the moulds and the crucibles can then tilt continuously right to left as shown in FIG. 4 to melt and homogenize the materials therein.

With respect to the overturning arm 22, it will be seen with reference to FIGS. 2*a* and 2*b* that it is arranged to be subject to an extended oscillation. The crucibles 4 can then rotate sufficiently to pour their contents into the moulds 6, and thereafter they can return to their normal position for fusing additional materials.

With reference to FIGS. 1*a* and 1*b*, it will be noted that there is provided a device for introducing a release agent in each of the crucibles during fusion. The device comprises a cup 72 which contains the releasing agent, as an example KI, in the form of pellets. A solenoid 31 is provided to move the cups 72 just above the crucibles and a second solenoid 74 is provided to move the cup holder 73 towards the right and stop abruptly so that the tablets of the non-wetting agent fall into the crucible. An air damper 71 is also provided to control the speed of the cup.

With reference to FIG. 2*a*, it will be noted that the support 9 for holding the moulds 6 is pivoted at 33 at the rear portion thereof to the rear of the U-shaped member 8. A latch 35 is provided to position the mould holding support 9 in the U-shaped member 8 relative to one another usually parallel with the moulds 6 facing the crucibles 4 all in the manner shown in FIG. 2*a* of the drawings.

In some cases, it may be preferable to carry out the analysis of the materials by means of a solution. In such a case, instead of pouring the contents of the crucibles 4 into the moulds 6, the pouring is carried out into beakers 10 which are placed on the frame 50 in known manner, all as shown in FIGS. 1*a* and 1*b* of the drawings. As pointed out above, means are provided to stir the solution by means of magnetic stirrer 11. If such is the case, when it is intended to dissolve the diffused material in the solution, the moulds are removed from the mould holding support 9, and when overturning the crucibles 4, the fused materials are poured directly into the beakers 10.

When using the crucible illustrated in FIG. 6, which has an inner protrusion 57 formed along the lower wall thereof, it may be preferable to stir the content of the crucible in a different way. In this case, the crucible is set at an angle with respect to the vertical, all as shown in FIG. 6, and a mechanical system known to those skilled in the art induces a rotation of the crucible about its axis while it is at that angle.

Although it has been mentioned above that the heating of the crucibles can be carried out by means of gas burners, which are placed underneath each crucible, it is obvious that any other heating means can be used, such as electrical heating means. For high altitudes where flame temperatures are lower than at sea level, a temperature booster has been invented to supply additional oxygen about the base of the burners 1. This accessory includes a skirt 85, a manifold 86 and a valve 87 and is connected to a supply of oxygen.

Finally, it may be intended to introduce oxygen or air into the fused materials. If such is the case, there is provided a duct 28 which leads to each individual crucible 4 and is connected in known manner to an air or oxygen supply 29 in combination with a valve 70.

The principle on which the apparatus operates is the following. The mixing crucible is the one shown in FIG. 4. Its general shape is similar to conventional crucibles except for the rounded conically shaped protrusion at the bottom. During fusion, when the crucible is tilted on one side, let us say to the left, the molten glass or partially molten mixture moves to that side and occupies a space that will be called 58A; when the crucible is tilted to the other side, to the right, the fluid mass moves again to a space similar to 58A that will be called 58B, but it is then forced to pass through the two narrower spaces 58 around the protrusion. In so doing, the fluid mass must change shape considerably and convection currents are produced therein. The deformation is equivalent to pouring the fluid from a container into another container. Only a few such transfers are necessary to homogenize the fluid thoroughly. In the fusion process for preparing samples that I have invented, it has been observed that particles of the sample sometimes form aggregates that are slow to dissolve into the flux unless very vigorous agitation is applied thereto. With the combination of an efficient mixing crucible as illustrated in FIG. 4, and slow repeated tilting, it has been observed that such aggregates break into smaller and smaller ones each time they are forced to pass around the protrusion. With a crucible that has no protrusion at the bottom or in the lower wall portion, it has been observed that these aggregates merely float on the molten flux and move slightly only, at each tilting cycle, indicating that a mere tilting is not effective for mixing.

The crucibles may have other shapes than that illustrated in FIG. 4. The only requirement is to have narrow spaces through which the fluid must pass when the crucible moves. Another example of a crucible that is very efficient for mixing when it is tilted about an axis parallel to the row of protrusions is shown in FIG. 5. With the crucible illustrated in FIG. 6, it is necessary to incline the latter and to induce its rotation about the axis of the crucible, as shown in FIG. 6.

The mechanical process for tilting the crucible during fusion and for pouring the molten glass is shown in FIGS. 2*a* and 2*b*. During the periodic tilting, the pin 32 on arm 22 is held in the groove 66 of the latch 19 to prevent arm 22 from moving. Since the width of the latch is designed so that one of the pins 32 or 60 must be free and the other must be engaged in its opening 66 or 62 at any given time, then the arm 15 is free to move. The motor 25 rotates continously at slow speed forward and backward as dictated by the microprocessor control. The rack 14 moves to the left and to the right with the arm 15 and rotates the gear 13 about the shaft 33 at the end of the arm 22. The crucibles and moulds being held fixed to the gear, they alternately tilt to the left and to the right but remain at the same place above the burners 1, causing the mixture to mix while it fuses.

Just before pouring the molten glass, the motor 25 does not change its direction of rotation so that the pin 60 is stopped by the latch 19 at 80. The forces exerted on the latch raise the latch which locks the arm 15 and rack 14 in a fixed position, stopping the periodic tilting of the crucible. This also unlocks the arm 22 so that the gear 13 rolls over the rack 14 bringing with it the crucibles that tip over and pour their content away from the burners 1.

The system of holders for the moulds is shown in FIGS. 1*a*, 2*a*, 2*b*, 3*a* and 3*b*. The mould holders 7 are firmly attached to the support 9 that is fastened on the gear 13 by means of screws 81 so that the crucibles alternately tilt left and right when the gear rotates about its axis. The crucible holders 5 are firmly attached to the support 8 that can rotate at two points 34 on the shafts 33 and 52. Normally the supports 8 and 9 are parallel during fusion as shown in FIG. 2*a*, the support 8 being supported by the support 9. During heating the moulds are in inverted position; during pouring the moulds rotate with the crucibles about the axis of the gear 13 which rolls along the rack 14 (FIG. 2*a*). The motion stops when the moulds have rotated 180° towards the left and have reached a horizontal position. During that motion the latch 35 abuts against a pin on the frame (not shown) which releases the pin 82 from the opening 83; the force of gravity acts in such a direction that the holders 8 and 9 separate and the pin 82 moves to the opening 84, so that the crucibles make an angle of about 30° with the moulds when pouring takes place.

When the purpose of fusion is to prepare solutions, the motion of the crucibles is the same as described above but no mould is used; instead a beaker 10 containing a liquid able to dissolve glass is placed so as to receive the molten glass. Dissolution of the glass is obtained by agitating the solution by means of any conventional means such as a magnetic stirrer 11.

Since various modifications can be made to the invention hereinbefore described and illustrated in the accompanying drawings, and numerous variations may be made thereto without departing from the spirit and scope of the present invention, it is intended that the said description and drawings are to be interpreted as illustrative only, and not in a limiting sense, and that only such limitations should be placed upon the invention as are specifically contained in the accompanying claims.

I claim:

1. An apparatus for melting and diffusing materials comprising:
  - a plurality of crucibles,
  - each said crucible being formed with at least one inner protrusion therein to form narrower passages in said crucible;
  - a rotatable crucible support and means for mounting said crucibles on said rotatable crucible support;
  - heating means for melting the content of said crucibles;
  - means to produce continuous deformation of the molten content of said crucible consecutive to contiuous movement of said molten content in and out of said narrower passages so as to produce substantially homogeneous diffusion of the materials in said crucibles; and
  - means associated with said rotatable support to pour the molten contents of diffused materials present in said crucibles, into fused material containers.

2. Apparatus according to claim 1, wherein said means to cause rotation of said crucibles include means for rocking said rotatable crucible support to cause continuous right and left tilting of said crucibles resulting in said continuous deformation of their molten contents.

3. Apparatus according to claim 2, wherein said crucibles are formed at the bottom thereof with a rounded conically shaped protrusion.

4. Apparatus according to claim 2, wherein said crucibles are formed at the bottom thereof with a plurality of rounded conically shaped protrusions.

5. Apparatus according to claim 1, wherein said crucibles are formed with at least one rounded conically shaped protrusion at the lower end of the wall thereof.

6. Apparatus according to claim 2 which comprises a frame, said crucible support comprising a U-shaped member mounted on said frame, said crucibles being mounted on said U-shaped member by means of U-shaped fork type holders, shaft portions associated with both legs of said U-shaped member to define the axis of rotation of said crucible support, the rocking means being coupled to said shaft portions.

7. Apparatus according to claim 6, wherein said crucibles are spacedly aligned along the base of said U-shaped member so that the axis of rotation of said crucible support extends through the aligned crucibles.

8. Apparatus according to claim 7, wherein said fused material containers consist of a plurality of moulds, said crucible support being coupled to a mould support, said mould support comprising a plurality of mould holders to hold said moulds opposite said crucibles.

9. Apparatus according to claim 7, wherein said fused material containers consist of a plurality of beakers adapted to contain a solution capable of dissolving said fused materials.

10. Apparatus according to claim 8, wherein said support is constructed to position said moulds immediately above said crucibles when fusing of said materials takes place.

11. Apparatus according to claim 10, wherein the pouring means comprises rotating means associated with at least one of said shaft portions to rotate said crucible support and capable of inducing an upside down rotation of said crucibles resulting in a pouring of said molten materials into said moulds.

12. Apparatus according to claim 9, which comprises a tilting arm formed with a toothed rack at the upper end thereof, a toothed gear meshing with said toothed rack and engaging at least one of said shaft portions, a pivot member along said tilting arm about which said tilting arm is allowed to pivot, a first engageable pin at the lower end of said tilting arm, a first pivoting latch provided with a first opening to engage said first engageable pin, the first opening of said first latch being disengageable from said first engageable pin, to permit free pivoting of said tilting arm about said pivot member and said first opening being able to engage said first engageable pin and to block the pivoting of said tilting arm, means to cause oscillation of said tilting arm about said pivot member when said first latch is disengaged from said first engageable pin so as to induce a back and forth rotation of said tooth gear which provides said right and left tilting of said crucibles, and means to cause said toothed gear to ride along said toothed rack when said tilting arm is blocked resulting from engagement of said first latch with said first engageable pin so as to cause said crucibles to rotate substantially upside down to pour their contents into said moulds.

13. Apparatus according to claim 12, which comprises an overturning arm pivoted along its length on said pivot member, the upper end of said overturning arm being connected to said toothed gear for free rotation thereof, a second engageable pin at the lower end of said overturning arm, a second opening of said first pivoting latch to engage said second engageable pin, so that when said second opening of said first second latch is disengaged from said second engageable pin, to permit free pivoting of said overturning arm about said pivot member, and when said second opening is engaged with said second engageable pin, to block the pivoting of said overturning arm, so that when said tilting arm is blocked by said first latch, said overturning arm is allowd to pivot, means to cause oscillation of said overturning arm about said pivot member when said second latch is disengaged from said first second engageable pin and said tilting arm is blocked by said first latch to cause said toothed gear to ride back and forth on said toothed rack thereby provoking a sufficient rotation of said crucible support to overturn said crucibles and to pour their contents into said moulds.

14. Apparatus according to claim 13, which comprises means for injecting oxygen at the base of the burners to increase temperature of flame.

15. Apparatus according to claim 13, which comprises means for introducing a releasing agent into said crucibles during fusion.

16. Apparatus according to claim 15, wherein said means for introducing said releasing agent comprise a cup for each crucible adapted to contain said releasing agent in the form of pellets, solenoids to push said pellets out of said cups into said crucibles, and means operable to activate said solenoids.

17. Apparatus according to claim 13, wherein said support for holding said moulds is pivoted at the rear portion thereof to the rear of said U-shaped member, a second latch is provided to position the mould holding support and the U-shaped member relative to one another at angles of 0° and about 30° with the moulds substantially facing said crucibles.

18. Apparatus according to claim 17, which comprises a plurality of beakers adapted to contain a solution capable of dissolving said fused materials, so that when it is intended to dissolve said fused materials in said solution, said moulds are removed from said mould holding support and when overturning said crucible said fused materials are poured directly into said beakers.

19. Apparatus according to claim 18 which comprises means for mixing the content of said solution in said beakers.

20. Apparatus according to claim 5, wherein said means to produce continuous deformation of said molten content of said crucibles comprises means to set said crucibles at an angle with respect to the vertical, and means to induce rotation of said crucible while at said angle.

21. Apparatus according to claim 1, wherein the heating means comprise gas burners placed underneath each said crucible.

22. Apparatus according to claim 1, wherein the heating means comprise electrical heating means.

23. Apparatus according to claim 1, which comprises duct means connected to a supply of air or oxygen, and leading to each of said crucibles, and means to introduce air or oxygen into said crucibles during fusion.

24. A crucible for fusing materials which is formed with substantially cylindrical walls and a substantially flat bottom, characterized in that it comprises at least one inner protrusion to form narrow passages in said crucible; and means for reciprocably tilting said crucible.

25. A crucible according to claim 24, where said protrusion is formed at the bottom thereof and is a rounded conically shaped protrusion.

26. A crucible according to claim 25, which comprises a plurality of said rounded conically shaped protrusions at the bottom thereof.

27. A crucible according to claim 26, wherein said plurality of rounded conically shaped protrusions are disposed in a row at the bottom of said crucible.

28. A crucible according to claim 25, wherein said rounded conically shaped protrusion is formed at the lower end of the wall of said crucible.

29. A method for melting and diffusing materials by heating said materials in a crucible until fusion, and stirring the resulting molten mixture, the improvement which comprises providing said crucible with at least one inner protrusion therein to form narrower passages in said crucible, and producing a continuous deformation of the molten content of said crucible consecutive to continuous movement of said molten content in and out of said narrower passages so as to produce substantially homogeneous diffusion of said materials in said crucible.

30. A method according to claim 29, wherein said continuous deformation is produced by rocking the crucible to cause continuous right and left tilting thereof until said diffusion is obtained.

31. Apparatus for diffusing materials comprising:

a crucible having substantially cylindrical walls, a substantially flat bottom, and an inner protrusion means for forming a narrow passage in said crucible; and means for moving material contained within said crucible in and out of said narrow passage and for reciprocably tilting said crucible.

32. An apparatus according to claim 31, wherein said protrusion is formed at the bottom of said crucible and is a rounded conically shaped protrusion.

33. A crucible for fusing materials which is formed with substantially cylindrical walls and a substantially flat bottom, comprising at least one inner protrusion to form narrow passages in said crucible; and means for rotating said crucible about an inclined axis.

* * * * *